H. K. BENTE.
INTERNAL COMBUSTION ENGINE
APPLICATION FILED DEC. 30, 1916

H. K. Bente, Inventor

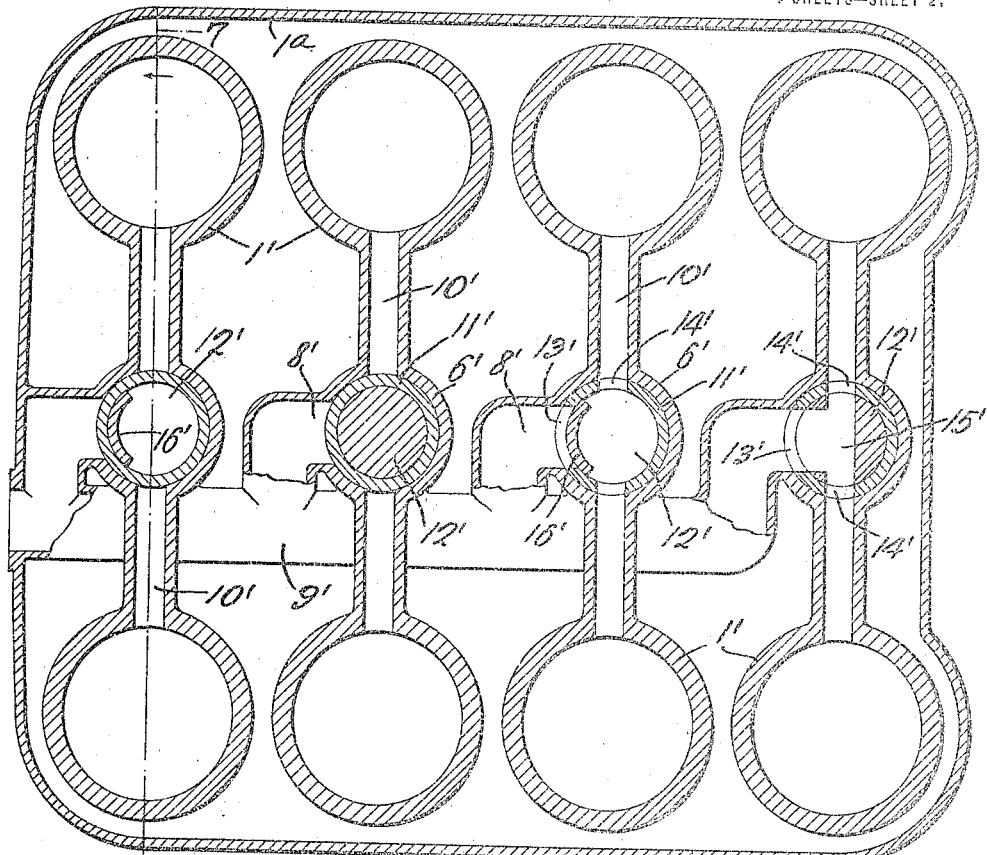
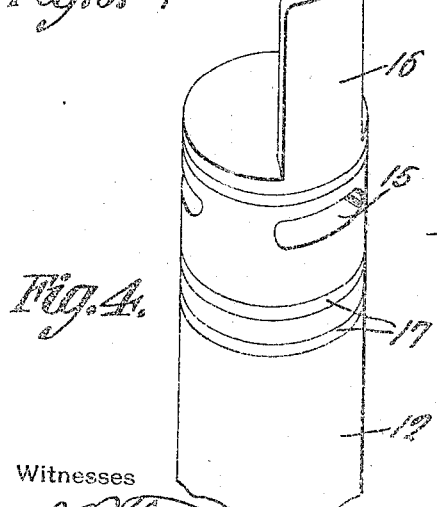
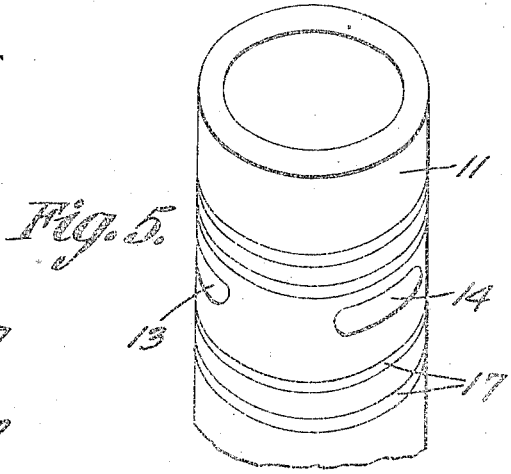

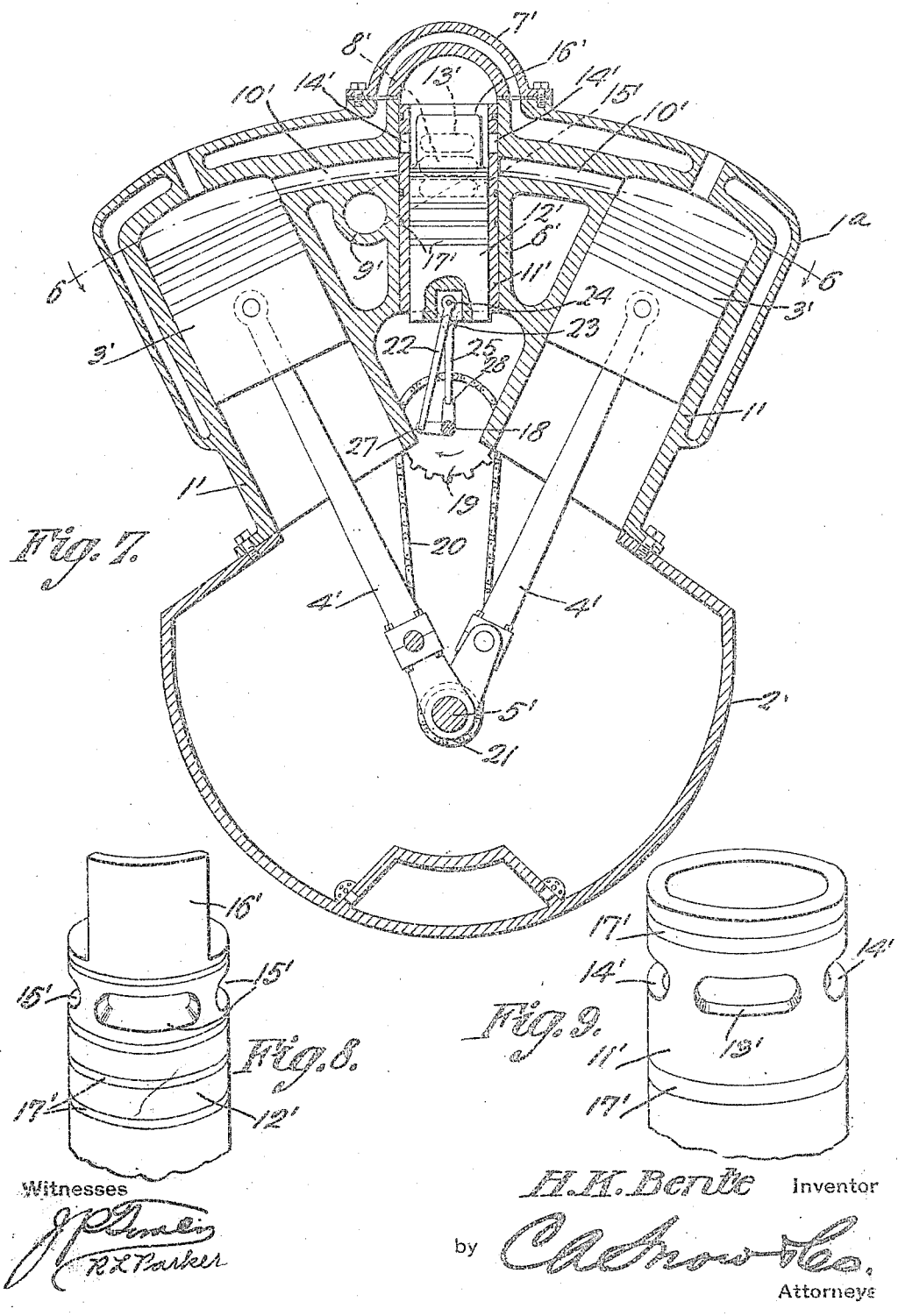

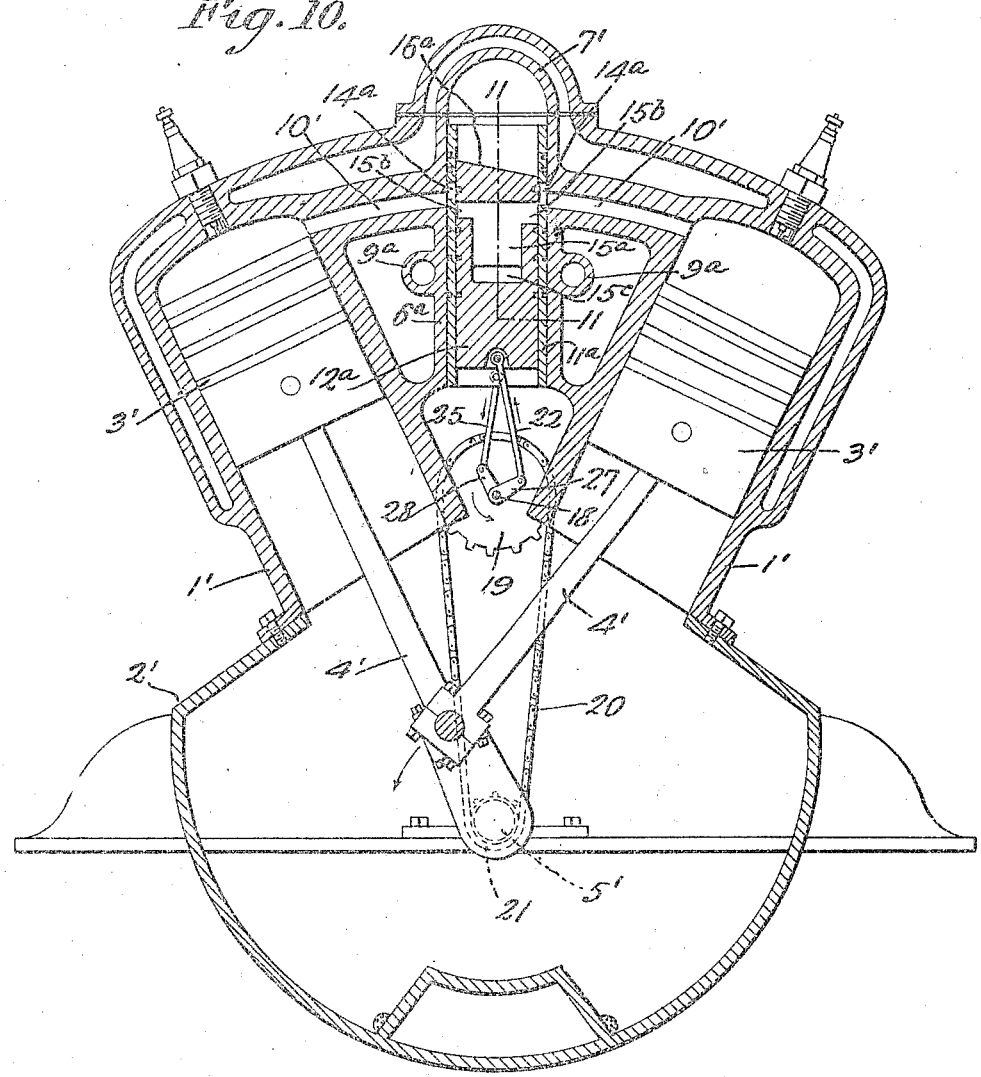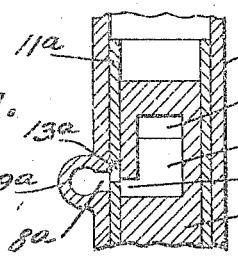

UNITED STATES PATENT OFFICE.

HENRY K. BENTE, OF SEDALIA, MISSOURI.

INTERNAL-COMBUSTION ENGINE.

1,261,207.

Specification of Letters Patent.     Patented Apr. 2, 1918.

Application filed December 30, 1916. Serial No. 139,869.

*To all whom it may concern:*

Be it known that I, HENRY K. BENTE, a citizen of the United States, residing at Sedalia, in the county of Pettis and State of Missouri, have invented a new and useful Internal-Combustion Engine, of which the following is a specification.

The present invention appertains to internal combustion engines, and aims to provide an engine having assembled therewith a novel and improved valve mechanism for controlling in a most effective manner, the intake and exhaust of the respective cylinders, the present invention being applicable to engines having one, four, six, eight or more cylinders with equal propriety and success.

It is the object of the invention to provide valves assembled with the cylinders in a unique manner, and operable in a novel manner, to provide for the intake and exhaust at the proper moments.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figs. 4 and 5 are perspective views of one pair of valves separated from one another, portions being broken away.

Fig. 6 is a section of an eight (twin) cylinder engine embodying the present improvements, this section being taken on the line 6—6 of Fig. 7.

Fig. 7 is a vertical section taken on the line 7—7 of Fig. 6.

Figs. 8 and 9 are perspective views of one pair of valves of the twin cylinder engine separated from one another, portions being broken away.

Fig. 10 is a sectional view similar to Fig. 7, illustrating another modification for use in a multicylinder engine.

Fig. 11 is a sectional view taken on the line 11—11 of Fig. 10.

Figure 1:
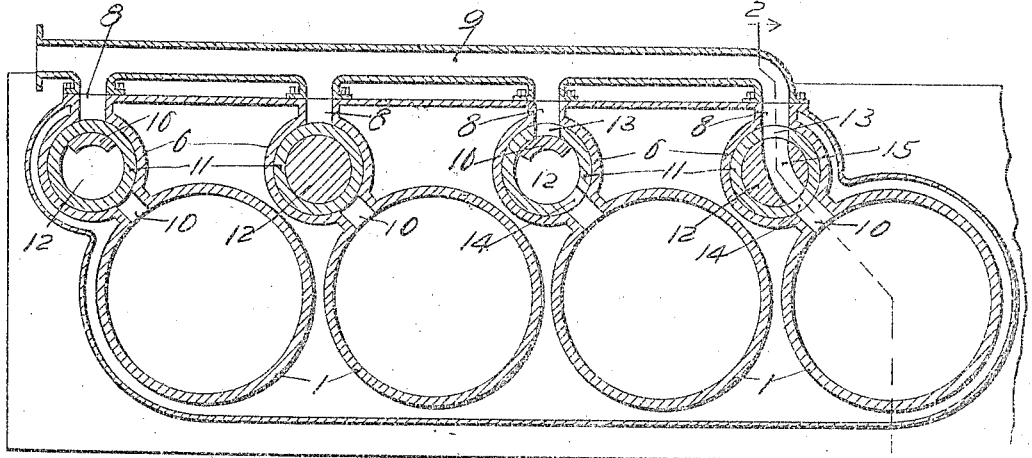
Figure 1 is a horizontal section of a four cylinder engine, this section being taken on the line 1—1 of Fig. 2.

The present improvements can be used in engines having various numbers of cylinders, and as illustrated, the improvements are applied to a four cylinder and an eight cylinder engine, which will be taken up in the order named. The application of the invention to other engines will be obvious when the invention is better understood.

Referring particularly to Figs. 1 to 5, inclusive, there are provided four upright cylinders 1 having their lower open ends attached to the crank case 2, and within which cylinders the pistons 3 are mounted for reciprocation. Said pistons are connected as usual by pitmen or connecting rods 4 with the crank shaft 5 mounted for rotation in the crank case 2.

In carrying out the invention, each cylinder 1 has cast integral therewith or attached thereto a vertical cylindrical valve casing 6 open at both ends, and disposed parallel with the cylinder. Attached to the upper ends of the valve casings 6 is the discharge manifold 7, and the valve casings 6 are provided at their outer sides with intake ports 8 adjacent their upper ends. An intake manifold 9 is attached to the water jacket surrounding the cylinders to communicate with the intake ports 8, and the walls or partitions between the cylinders 1 and casings 6 are provided with ports 10 adjacent the upper ends or heads of the cylinders and the upper ends of the casings 6. The ports 10 are in the same horizontal plane as the ports 8, although this is not compulsory.

Slidable within each valve casing 6 is a tubular or sleeve valve 11, and a cylindrical valve 12 is mounted for sliding movement within the sleeve valve 11. The valve 11 is provided with a port 13 at one side adapted to move into and out of registration with the intake port 8, and said valve 11 has an opposite port 14 adapted to move into and out of registration with the port 10 leading into the cylinder. The ports 13 and 14 are arranged adjacent the upper end of the valve 11, and the valve 12 is provided adjacent its upper end with a port 15 extending laterally therethrough and adapted to register with the ports 13 and 14 simultaneously. The upper end of the valve 12 has an upstanding shutter or wing 16 adapted to cover the port 13 under certain conditions while the port 14 is uncovered. The sleeve valve 11 is provided with packing rings 17 above and below its ports bearing against the walls of the casing 6, and the valve 12 is provided with similar packing rings 17 bearing against the walls of the valve 11, whereby to prevent leakage.

The valve actuating means embodies a valve crank shaft 18 mounted for rotation within the crank casing 2 at one side of the main crank shaft 5, and operated at one-half the speed of the crank shaft 5. Thus, a sprocket wheel 19 is secured upon the shaft 18 and is connected by a sprocket chain 20 with a sprocket wheel 21 secured to the shaft 5 and of a diameter one-half that of the sprocket wheel 19. The crank shafts can be connected in any other suitable manner, however, to provide for the proper speed ratio between them. The crank shaft 18 is connected by a pitman or connecting rod 22 with each valve 12, the lower end of said valve having a recess 23 receiving the upper end of the connecting rod, and a wrist pin 24 being secured to the valve within the recess 23 with which the connecting rod is engaged. Each of the valves 11 is connected by a connecting rod or pitman 25 with the crank shaft 18, the valve 11 being provided at its lower end with a depending ear 26 to which the upper end of the connecting rod 25 is pivoted. The crank shaft 18 has a pair of cranks 27—28 for each pair of valves, the connecting rods 22 and 25 being engaged with the respective cranks 27 and 28, and said cranks being set at an angle of 90 degrees relative to one another.

Figure 2:
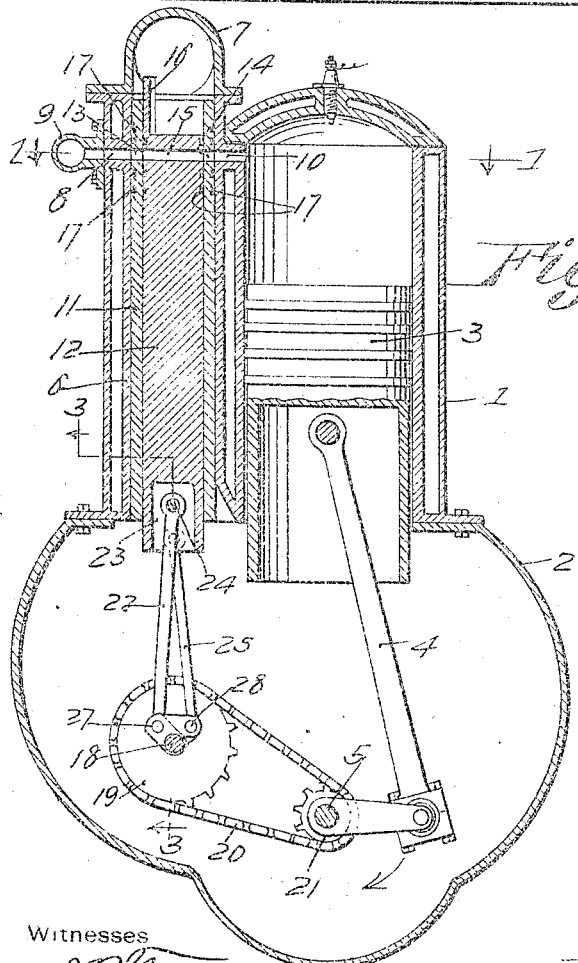
Fig. 2 is a vertical section taken on the line 2—2 of Fig. 1.
Figure 3:
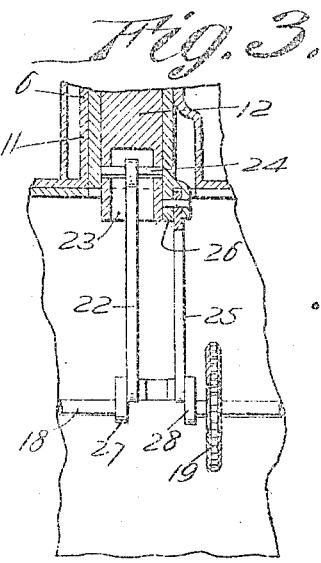
Fig. 3 is a sectional detail illustrating the actuating means for one pair of valves.

In operation, the valve mechanism is so timed relative to the movement of the pistons, that the valves of the respective cylinders operate in succession. When the piston 3 of a cylinder 1 reaches the end of its exhaust stroke and starts downwardly through its intake stroke, the crank shaft rotating in the direction of the arrow in Fig. 2, the respective valve cranks 27 and 28 will be moving upwardly and downwardly, respectively, in the same direction of rotation as the crank shaft 5. During the intake stroke of the piston 3, the ports 13 and 14 of the sleeve valve 11 register with the respective ports 8 and 10, and the port 15 of the valve 12 is brought into registration with the ports 13—14, thus establishing communication between the intake manifold 9 and the cylinder 1, whereby the charge will be sucked into the cylinder. When the piston reaches the end of its intake or suction stroke, the movement of the cranks 27 and 28 will have moved the sleeve valve 11 downwardly and the valve 12 upwardly, whereby the valve 11 closes the ports 8—10, the casing 6 closes the ports 13—14, and the valve 12 closes the ports 13—14, thereby positively cutting off the communication between the intake manifold and cylinder. When the respective crank of the crank shaft 5 is in its lowermost position after the piston 3 has reached the end of its intake stroke, the valve 12 is moved to its highest position, and the valve 11 is in its intermediate position during its downward movement with the ports 8, 10, 13, 14 and 15 all closed. During the upward movement of the piston 3 through its compression stroke, the valve 11 continues its downward movement, keeping the ports 8, 10, 13 and 14 closed, and the valve 12 during the compression stroke of the piston moves downwardly to an intermediate position. The ports are thus closed during the compression stroke of the piston, whereby the charge within the cylinder will be compressed without the liability of leakage occurring. When the piston 3 has reached the end of its compression stroke, the valve 11 is in its lowermost position, and the valve 12 is in an intermediate position during its downward course. The compressed charge is then ignited by means of a spark plug or other igniter, and the piston 3 is forced downwardly through its power stroke. During the power stroke of the piston 3, the sleeve valve 11 is moved upwardly to intermediate position, and the valve 12 is moved downwardly to its lowermost position, the port 10 being sealed by the valve 11 during the explosion. Then, when the piston moves upwardly through its exhaust stroke, the sleeve valve 11 in being raised above its intermediate position brings the ports 13—14 into register with the ports 8—10, the upper end of the valve 12 being below the port 14, while the baffle 16 of the valve 12 closes the port 13. Communication is therefore established between the exhaust manifold 7 and the cylinder 1, whereby the burnt charge will be ejected from the cylinder into the exhaust manifold during the exhaust stroke of the piston, and when the piston reaches the end of its exhaust stroke, the operation is repeated. It will be noted that when the ports 8, 13, 15, 14 and 10 aline or register as seen in Fig. 2, the upper portions of the valves 11 and 12 will provide a barrier between the exhaust manifold 7 and said ports, whereby to prevent the burnt charge within the manifold being sucked back into the cylinder. The utility of the valves is not affected by the presence of carbon thereon, and in fact carbon deposit upon the valves serves to increase the leak-resisting qualities of the valves by closing any possible crevices or gaps through which leakage might occur. The valves in sliding relative to one another and in sliding within the casing 6, provide a shearing action adjacent the ports, whereby to remove carbon deposits from the valves and valve casing, thus keeping the valves and their casing comparatively clean, the particles of carbon being blown out with the exhaust. It will of course be understood that the cranks 27—28 of the valve crank shaft 18 are arranged in successive positions, the same as the cranks of the crank shaft 5, whereby the valves of the cylinders operate in regular order. The pairs of cranks 27—28 are set at the same angles relative to one another as the cranks of the crank shaft. By detaching the exhaust manifold 7, the valves are exposed, and then by disconnecting the connecting rods 22—25, the valves can be withdrawn through the upper ends of their casings 26, for purpose of examination, repair or replacement.

The eight cylinder construction illustrated in Figs. 6 and 7, embodies the same principles as above described, but by arranging the cylinders in pairs, as in twin cylinder engines, one pair of valves will suffice for each pair of cylinders. The cylinders 1' which are disposed side by side at a suitable angle, are attached at their lower open ends to the crank casing 2', and the pistons 3' which work within the cylinders are connected by the connecting rods 4' with the cranks of the crank shaft 5' mounted for rotation in the crank casing 2'. The casting 1$^a$ of which the cylinders 1' are a part, is provided with vertical open ended tubular valve casings 6' in the median plane of the engine between the opposite cylinders, and each valve casing is united with one pair of the cylinders. The upper ends of the casings 6' have attached thereto the exhaust manifold 7', and the cylinder casting is provided with tubular branches or intake ports 8' extending from the casings 6' adjacent their upper ends to one side thereof and connected to the longitudinal intake manifold 9' arranged within the water jacket at one side of the casings 6' between the cylinders. The manifold 9' extends to one end of the water jacket for the attachment of the carbureter. The walls or portions between each casing 6' and the respective pair of cylinders are provided with ports or passages 10' preferably arranged in substantially the same horizontal plane as the ports 8'. A tubular or sleeve valve 11' is slidable within each casing 6', and a piston or cylindrical valve 12' is slidable within each sleeve valve 11', the same as with the structure above described. The valve 11' has a port 13' to register with the respective intake port 8', and said valve has a pair of ports 14' to register simultaneously with the respective ports 10' of the adjacent cylinders. The valve 12' is provided with a three-branched or T-shaped port or passage 15' whose branches are adapted to register simultaneously with the ports 13' and 14', and the upper end of said valve 12' has a baffle 16' for closing the port 13' during the exhaust stroke of the respective pistons. The valves are also provided with packing rings 17' above and below their ports to avoid leakage. The operating mechanism for the valves is practically the same as that above described, the same reference characters being used, so that a reiteration will not be necessary.

The operation of the eight or twin cylinder engine is practically the same as that of the four cylinder engine above described, but due to the duplication of the ports 10' and 14', each valve device simultaneously controls the intake and exhaust of a pair of cylinders. The operation will no doubt be apparent from the foregoing, since it is substantially the same with the exception that, as above intimated, the cylinders are arranged in pairs, and each pair is simultaneously brought into communication at the proper time with the intake and exhaust manifolds.

In the modification depicted in Figs. 10 and 11, the connecting rods 4' of each pair of pistons 3' are connected to the same crank of the crank shaft 5' instead of separate cranks, as shown in Fig. 7. This necessitates some changes in the valves, and this modification also includes other changes in the valve construction that are of advantage. Thus, the cylindrical valve casing 6$^a$ is in communication with the head end of the cylinders by way of the ports 10', but the intake port 8$^a$ of the valve casing 6$^a$ is offset inwardly or downwardly from the ports 10', as well as the port 13$^a$ of the sleeve valve 11$^a$. The other ports 14$^a$ of the sleeve valve are adapted to register with the ports 10', one port 14$^a$ extending slightly inwardly or downwardly beyond the other port 14$^a$, whereby to register with the corresponding ports 10' first. As illustrated, the right hand piston 3' moves slightly ahead of the left hand piston 3', as seen in Fig. 10, and the right hand port 14$^a$ will provide for the inlet of the fuel into the right hand cylinder 1' before the fuel flows into the left hand cylinder. The cylindrical valve 12$^a$ which slides within the sleeve valve 11$^a$, is provided with a longitudinal chamber 15$^a$ having a T-shaped end providing the opposite ports 15$^b$ to register with the ports 14$^a$, the right hand port 15$^b$ being larger than the left hand port 15$^b$, in order that the right hand ports 14$^a$ and 15$^b$ will start to register before the left hand ports 14$^a$ and 15$^b$. The lower or inner end of the chamber 15$^a$ terminates in a lateral port 15$^c$ offset downwardly or inwardly from the ports 15$^b$, and adapted to register with the port 13$^a$, as seen in Fig. 11. One or two intake manifolds 9$^a$ can be employed, the same communicating with the intake port 8$^a$ of the valve casing 6aᵃ of each pair of cylinders. In this form, due to offsetting of the ports 8ᵃ, 13ᵃ and 15ᵇ, the shutter or wing 16 is eliminated, but the upper or outer end of the valve 12ᵃ is inclined, as at 16ᵃ, whereby to permit of the escape of exhaust gases from the right hand cylinder before the left hand cylinder. As shown in Fig. 10, the right hand piston 3' has started through its intake stroke, while the left hand piston 3' is at the end of its exhaust stroke, the sleeve valve 11ᵃ being started in its downward movement, while the valve 12ᵃ is completing its upward movement. Thus, the right hand ports 14ᵃ and 15ᵇ have started to register, the port 14ᵃ registering with the port 10' at the right, so that the gaseous fuel can flow from the manifold 9ᵃ through the ports 8ᵃ, 13ᵃ and 15ᵇ which have started to register, as seen in Fig. 11, the fuel flowing from the chamber 15ᵃ through the right hand ports 15ᵇ and 14ᵃ into the ports 10' of the right hand cylinder. When the parts have moved a little farther, the left hand piston 3' now starting through its intake stroke, the left hand ports 14ᵃ and 15ᵇ are brought into registration, thus enabling the fuel to also flow into the left hand cylinder. Then when the pistons move through their compression strokes, the valve 11ᵃ being moved downwardly, and the valve 12ᵃ being moved upwardly, will close the ports, whereby the charges are compressed, said ports remaining closed during the explosion strokes of the pistons, the charge of the right hand piston being fired before the charge of the left hand cylinder, due to the advance movement of the right hand piston. During the exhaust strokes of the pistons, the valve 12ᵃ is lower down than the valve 11ᵃ, so that the ports 14ᵃ are above the upper end 16ᵃ of the valve 12ᵃ, and said end 16ᵃ being inclined will enable the right hand port 14ᵃ to be brought into communication with the exhaust manifold 7' before the left hand port 14ᵃ. This construction provides for the successive operations of the pistons of the cylinders of each pair, as contra-distinguished from the simultaneous operation of the pistons of the cylinders of each pair, with the structure shown in Fig. 7.

Having thus described the invention, what is claimed as new is:

1. In an internal combustion engine, a plurality of cylinders arranged in pairs, tubular valve casings between said pairs of cylinders and having their outer ends open, an exhaust manifold extending across said open ends of the casings and attached thereto, an intake manifold extending along one side of said casings between the casings and respective cylinders, said casings having intake ports communicating with the intake manifold, the casings having other ports communicating with the cylinders, and valves working within said casings for alternately connecting the second mentioned ports thereof with the intake ports and open ends of the casings.

2. In an internal combustion engine, a pair of cylinders, a tubular valve casing between them having two ports connected with the cylinders, said casing having an intake port and an open end for the exhaust, a sleeve valve slidable within the casing having three ports to register simultaneously with said ports of the casing, a valve slidable within the sleeve valve having ports to simultaneously register with the ports of the sleeve valve, and means for moving said valves relatively to each other and to the casing to alternately connect the intake and open end of the casing with both of the first mentioned ports.

In testimony that I claim the foregoing as my own, I have hereto affixed my signature in the presence of two witnesses.

HENRY K. BENTE.

Witnesses:
ARTHUR L. CRANDALL,
CHARLES C. WENCK.